(12) United States Patent
Dmitriev-Zdorov

(10) Patent No.: US 10,733,347 B2
(45) Date of Patent: Aug. 4, 2020

(54) STATISTICAL CHANNEL ANALYSIS WITH CORRELATED INPUT PATTERNS

(71) Applicant: Mentor Graphics Corporation, Wilsonville, OR (US)

(72) Inventor: Vladimir B. Dmitriev-Zdorov, Longmont, CO (US)

(73) Assignee: Mentor Graphics Corporation, Wilsonville, OR (US)

(*) Notice: Subject to any disclaimer, the term of this patent is extended or adjusted under 35 U.S.C. 154(b) by 618 days.

(21) Appl. No.: 14/793,579

(22) Filed: Jul. 7, 2015

(65) Prior Publication Data
US 2016/0004804 A1 Jan. 7, 2016

Related U.S. Application Data

(60) Provisional application No. 62/021,561, filed on Jul. 7, 2014.

(51) Int. Cl.
*G06F 30/367* (2020.01)
*G06F 111/08* (2020.01)

(52) U.S. Cl.
CPC ........ *G06F 30/367* (2020.01); *G06F 2111/08* (2020.01)

(58) Field of Classification Search
CPC .... G06F 17/5009; G06F 30/00; G06F 30/367; G06F 30/20
See application file for complete search history.

(56) References Cited

U.S. PATENT DOCUMENTS

| 5,515,387 A * | 5/1996 | Smith ............... H04L 25/03178 714/746 |
| 7,295,604 B2 * | 11/2007 | Cranford, Jr. .......... H04B 3/462 375/226 |
| 7,738,602 B2 * | 6/2010 | Langenbach ..... H04L 25/03197 375/341 |
| 8,660,811 B2 * | 2/2014 | Miller ................ G01R 31/3171 324/620 |

(Continued)

OTHER PUBLICATIONS

Holzlohner, Ronald, et al. "Accurate calculation of eye diagrams and bit error rates in optical transmission systems using linearization." Journal of Lightwave Technology 20.3 (2002): 389-400.*

(Continued)

*Primary Examiner* — Omar F Fernandez Rivas
*Assistant Examiner* — Joshua E. Jensen
(74) *Attorney, Agent, or Firm* — Mentor Graphics Corporation

(57) ABSTRACT

This application discloses a computing system configured to identify that a test input for a channel in an electronic device conforms to protocol having a correlated bit pattern. The computing system can determine transition probabilities for bits in the test input based on the protocol having the correlated bit pattern, and measure a step response of the channel. The computing system can perform statistical simulation or analysis on the channel based, at least in part, on the step response of the channel and the transition probabilities for bits in the test input, which can predict a signal integrity of the channel. The computing system can generate an eye diagram or a develop a bit error rate corresponding to the signal integrity of the channel.

20 Claims, 8 Drawing Sheets

(56) References Cited

U.S. PATENT DOCUMENTS

| | | | |
|---|---|---|---|
| 9,496,993 B1* | 11/2016 | Miller | H04L 1/205 |
| 2007/0092018 A1 | 4/2007 | Fonseka et al. | |
| 2013/0041645 A1* | 2/2013 | Kawata | G06F 17/5036 703/14 |
| 2015/0276839 A1* | 10/2015 | Liu | G06F 17/5063 703/2 |

OTHER PUBLICATIONS

Sanders, Anthony. "Statistical simulation of physical transmission media."IEEE Transactions on Advanced Packaging 32.2 (2009): 260-267.*

Holzlohner, Ronald, et al. "Accurate calculation of eye diagrams and bit error rates in optical transmission systems using linearization." Journal of Lightwave Technology 20.3 (2002): 389-400. (Year: 2002).*

Sanders, Anthony. "Statistical simulation of physical transmission media."IEEE Transactions on Advanced Packaging 32.2 (2009): 260-267. (Year: 2009).*

Kossel, Marcel A., and Martin L. Schmatz. "Jitter measurements of high-speed serial links." IEEE Design & Test of Computers 21.6 (2004): 536-543. (Year: 2004).*

Subbalakshmi, Koduvayur P., and Jacques Vaisey. "On the joint source-channel decoding of variable-length encoded sources: The additive-Markov case." IEEE transactions on communications 51.9 (2003): 1420-1425. (Year: 2003).*

M Tsuk, D. Dvorscsak, C.S. Ong, and J. White, "An electrical-level superimposed-edge approach to statistical serial link simulation," IEEE/ACM International Conf. on Computer-Aided Design Digest of Technical papers, Nov. 2, 2009, pp. 718-724.

F. Rao, V. Borich, H. Abebe, M. Yan, "Rigorous modeling of transmit jitter for accurate and efficient statistical eye simulation," DesignCon 2010, Feb. 1, 2010.

D. Oh, "Modeling and simulation of common clocking topologies for statistical link simulation," DesignCon 2011, Feb. 1, 2011.

N. Blitvic, V. Stojanovic, "Statistical simulator for block coded channels with long residual interference," IEEE International Conf. on Communications, Jun. 24, 2007.

K. Balasubramanian, S. Agili, and A. Morales, "Investigating the new 64b/66b encoding scheme's power spectral density," IEEE International Conf. on Consumer Electronics (ICCE), Jan. 9, 2011.

Dan Oh, "Multiple edge responses for fast and accurate system simulation," IEEE Electrical Performance of Electronic Packaging, Oct. 23, 2006, pp. 163-166.

JiHong Ren, Kyung Suk Oh, "Multiple edge responses for fast and accurate system simulation, IEEE Trans. on Advanced Packaging," V.31, No. 4, Nov. 28, 2008.

V. Stojanovic and M. Horowitz, "Modeling and analysis of high-speed links," Proc. IEEE Custom Integrated Circuit Conf., Sep. 21, 2003, pp. 589-594.

D. Oh, F. Lambrecht, S. Chang, Q. Lin, J. Ren, C. Yuan, J. Zerbe, and V. Stojanovic, "Accurate system voltage and timing margin simulation in high-speed I/O system designs," IEEE Trans. on Advanced Packaging, v.31, No. 4, May 2, 2008.

V. Dmitriev-Zdorov, M. Miller, C. Ferry, "The jitter-noise duality and anatomy of an eye diagram," DesignCon, 2014, Jan. 28, 2014.

S. Apostolov et al, "High-order correlation functions of binary multi-step Markov chains," arXiv:physics/0610081, v1, physics. data-an, Oct. 11, 2006.

Min, Byungho et al."A 20 Gb/s triple-mode (PAM-2, PAM-4, and duobinary) transmitter."Microelectronics Journal 43.10 (2012), pp. 687-696.

* cited by examiner

STATISTICAL CHANNEL ANALYSIS WITH CORRELATED INPUT PATTERNS

RELATED APPLICATION

This application claims priority to U.S. Provisional Patent Application Ser. No. 62/021,561, filed Jul. 7, 2014, which is incorporated by reference herein.

TECHNICAL FIELD

This application is generally related to electronic design automation and, more specifically, to statistical analysis of transmission channels within an electronic circuits and systems.

BACKGROUND

Modern digital electronic circuits and systems can transmit or convey sequences of binary values, commonly referred to as bit sequences or digital signals. These bit sequences can be conveyed as voltage waveforms, wherein the voltage amplitude for a given time period or bit, corresponds to a binary logic value at that same time period. Accordingly, a digital signal can appear as a voltage waveform in the signal lines and transmission channels of electronic systems. As a digital signal is transmitted through a circuit, various effects may cause the signal to degrade, often to the point that errors occur. Errors within a digital signal may be quantified by a bit error rate. In many instances, the bit error rate of a circuit or signal pathway is defined as the ratio of incorrectly received bits to the total number of bits transmitted. An important consideration in digital electronic design is fidelity, or the quality with which a signal is conveyed. The fidelity of an electronic system is often referred to as signal integrity. As designers have increased the speed of operation and manufacturing has scaled the physical dimensions of today's modern circuits, signal integrity has become increasingly more important. Currently, virtually all electronic circuits are designed with signal integrity in mind.

Digital electronic designers often employ techniques to determine signal integrity of their designs. For example, these designers can utilize simulation tools to perform time-domain simulation on the channel to identify signal integrity problems before the device is manufactured. These simulation tools can allow the designer to account for issues that commonly cause signal degradation, such as ringing, crosstalk, noise, ground bounce, or inter-symbol interference. Time-domain simulation, however, is often time and resource intensive. From a practical standpoint, many designers can only simulate a channel for around 10,000,000 to 100,000,000 bits, which can provide a bit error rate of around 1e-7 to 1e-8, or one error every 10,000,000 to 100,000,000 bits. Current standards and reliability for channels, however, calls for bit-error rates of around 1e-12 to 1e-15, which would take four plus orders of magnitude longer to realize utilize time-domain simulation on the channel.

In an attempt to predict channel reliability in the face of the time-limitation imposed by bit-by-bit simulation, many designers implement peak distortion analysis. Peak distortion analysis often includes generation of a "worst-case input pattern" that, when input to the channel, would create a most-stressed or most-pessimistic prediction for an eye diagram associated with the channel. While this approach can allow designers to create a boundary of the eye diagram, it does not produce accurate bit error rate and creates over-pessimistic prediction of signal integrity.

Another form of channel reliability prediction is statistical simulation of the channel. Statistical simulation can determine probability distributions that describe eye-diagram, allowing predictions of the bit error rate BER as low as 1e-15 to 1e-20 bits and beyond, with minimal computational resources. Most conventional statistical simulation, however, incorporation many simplifications, such as an assumption that the channel is linear time-invariant (LTI), an assumption that jitter and noise is non-correlated, and an assumption that input bits are statistical independence, i.e. no correlation between bit-values in the input pattern. These simplifications eliminate the utilization of statistical simulation for analyzing many channels, such as those utilizing data encoding, such as 64b/66b, 128b/130b encoding, those utilizing a non-linear transmitter, and the like.

SUMMARY

This application discloses a computing system to include a channel analysis tool to perform statistical simulation on a channel receiving a correlated bit pattern. The correlated bit pattern can also be driven onto the channel with a non-linear driver that can introduce transmit jitter and an edge response that varies based on a bit-depth history, both of which can alter signal integrity of the channel. In some embodiments, the computing system can identify that a test input for a channel in an electronic device conforms to protocol having a correlated bit pattern. The computing system can determine transition probabilities for bits in the test input based on the protocol having the correlated bit pattern, and measure a step response of the channel. The computing system can perform statistical simulation or analysis on the channel based, at least in part, on the step response of the channel and the transition probabilities for bits in the test input, which can predict a signal integrity of the channel. The computing system can generate an eye diagram or a develop a bit error rate corresponding to the signal integrity of the channel. Embodiments of statistical simulation on a channel receiving a correlated bit pattern are described in greater detail below.

DETAILED DESCRIPTION

Illustrative Operating Environment

The execution of various applications may be implemented using computer-executable software instructions executed by one or more programmable computing devices. Because these embodiments of the invention may be implemented using software instructions, the components and operation of a generic programmable computer system on which various embodiments of the invention may be employed will first be described.

Figure 1:
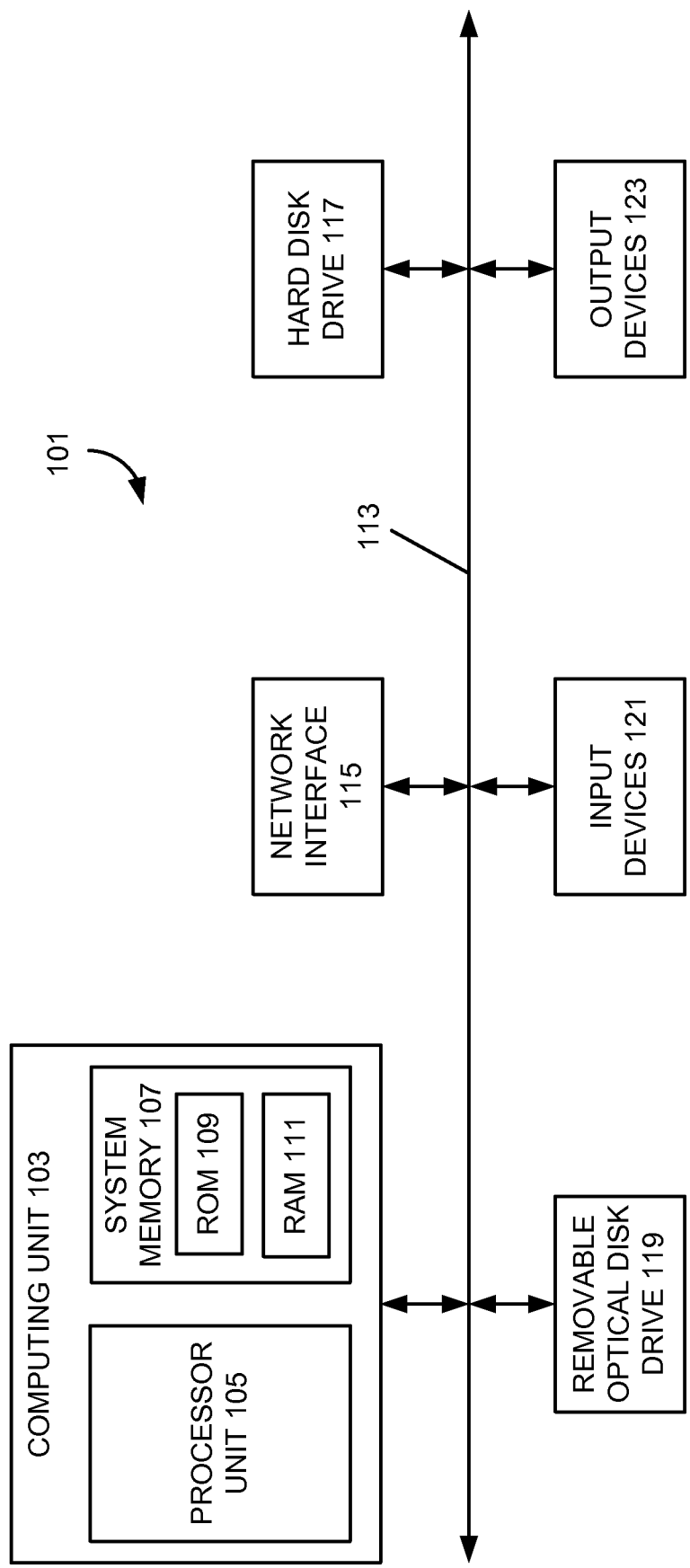
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 117, a removable magnetic disk drive, an optical disk drive 119, or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
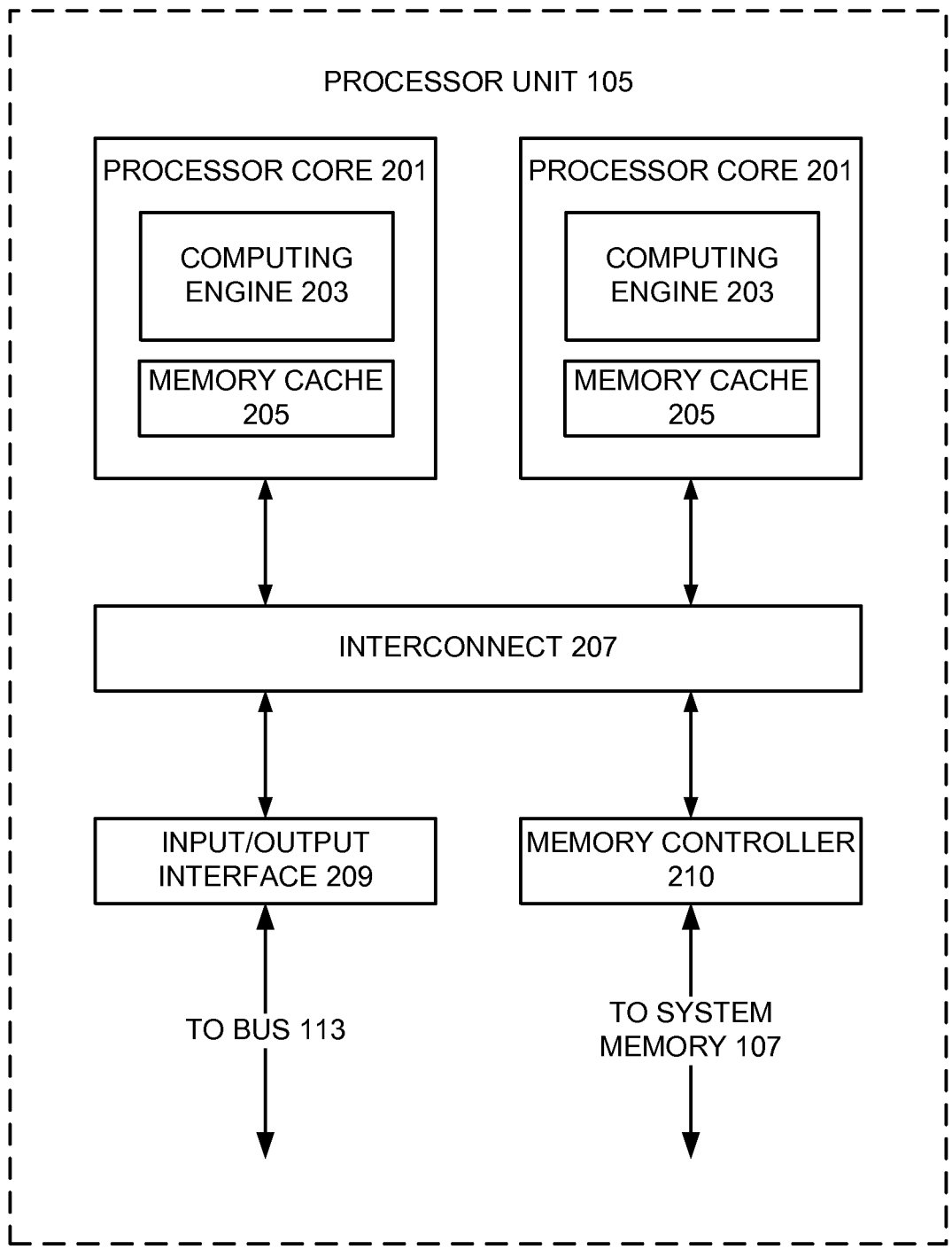

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Detailed herein are methods, apparatuses, and systems for analyzing circuit channels, typically channels designed to carry high-speed signals. The disclosed methods, apparatus, and systems may be used, for example, in a printed circuit board or an integrated circuit design flow to analyze signal integrity. The disclosed methods, apparatus, and systems should not be construed as limiting in any way. Instead, the present disclosure is directed toward all novel and nonobvious features and aspects of the various disclosed methods, apparatus, systems, and equivalents thereof, alone and in various combinations and sub-combinations with one another. The present disclosure is not limited to any specific aspect or feature, or combination thereof, nor do the disclosed methods, apparatus, and systems require that any one or more specific advantages be present or problems be solved.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods, apparatus, and systems can be used in conjunction with other methods, apparatus, and systems. Additionally, the description sometimes uses terms like "generate" and "determine" to describe the disclosed methods. These terms are high-level abstractions of the actual operations that are performed. The actual operations that correspond to these terms may vary depending on the particular implementation and are readily discernible by one of ordinary skill in the art.

Various implementations of the invention may be employed to analyze a channel to determine signal integrity. For example, traces, vias or other interconnects between a driver and a receiver in a printed circuit board layout may be evaluated. The signal integrity of a digital circuit may, in some examples, be presented as a bit error rate, which can correspond to a measure of degradation a bit sequence undergoes as a result of its being transmitted through the digital circuit. In addition to the bit error rate, the signal integrity of a channel is often analyzed by creating an "eye" diagram. Eye diagrams can be created through a variety of techniques, such as by repeatedly sampling a digital signal on the channel, for example, with signal measurement tools, such as an oscilloscope, and overlaying the various samples onto each other, by simulating transmission of the digital signals on the channel and overlaying simulated digital signals, or by performing statistical simulation of the channel.

Figure 3A:
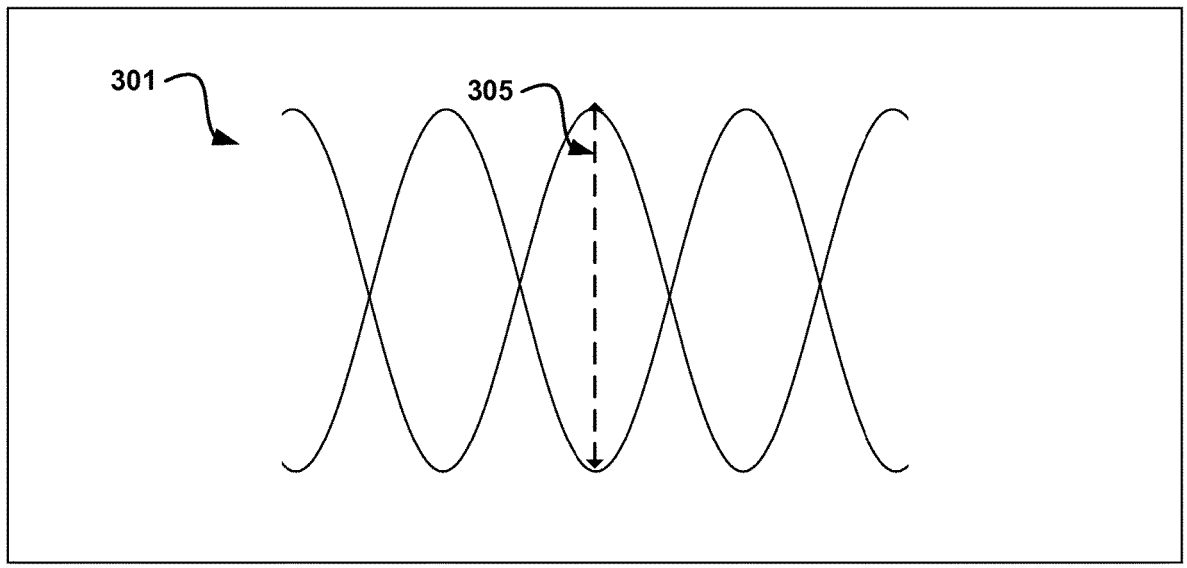
FIGS. 3A and 3B illustrate example eye diagrams, showing signal integrity of a circuit pathway.
Figure 3B:
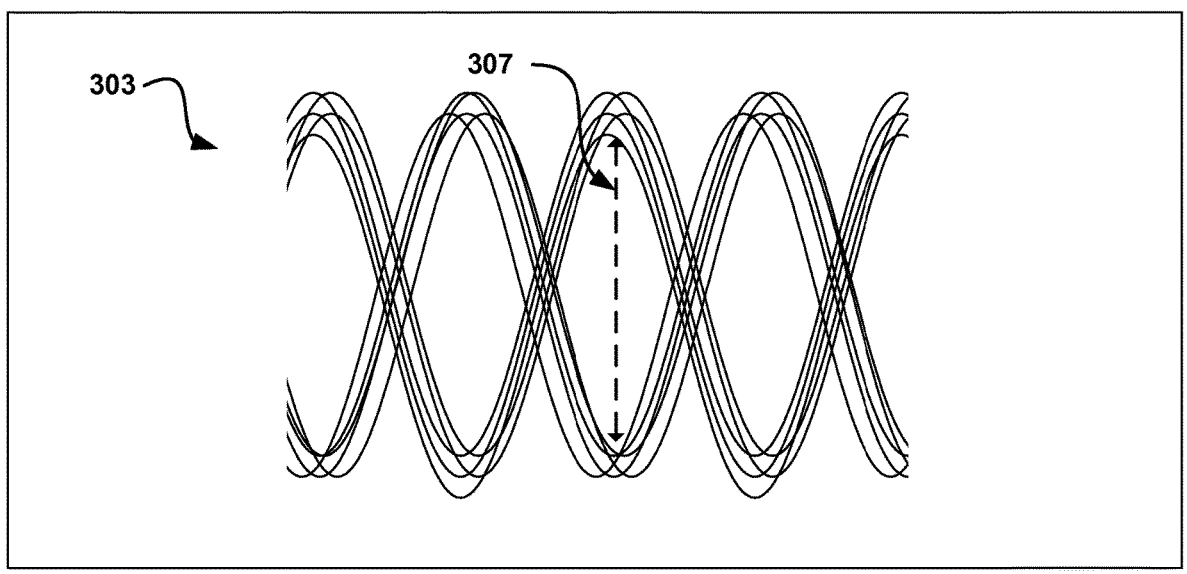

FIG. 3A illustrates an eye diagram 301, while FIG. 3B illustrates an eye diagram 303. As can be seen in FIG. 3A and FIG. 3B, the eye diagram 301 is undistorted, while the eye diagram 303 contains distortions. An eye diagram may appear distorted, such as the eye diagram 303, due to various electronic effects. For example, noise, timing issues, overshoot or undershoot will often manifest themselves as amplitude and phase errors within an eye diagram. The amount of distortion is often quantified by an opening in the eye diagram. FIG. 3A illustrates an opening 305 and FIG. 3B illustrates an opening 307. With various implementations of the invention, a bit sequence will be selected to produce to the largest eye opening in an eye diagram. With other implementations of the invention, a bit sequence will be selected to produce the smallest opening in an eye diagram.

Various implementations of the invention analyze the signal integrity of a channel within an electronic device. For example, a printed circuit board, application-specific integrated circuits (ASICs), including mixed-signal application-specific integrated circuits, systems-on-a-chip (SoCs), programmable logic devices (PLDs), such as field programmable gate arrays (FPGAs), fiber-optic transmission networks, optical channels, such as an optical channel between two components of an integrated circuit. Furthermore, techniques can also be employed to evaluate the integrity of power carrying channels. As stated above, a physical electronic device may be employed in various implementations of the invention. However, with various other implementations of the invention, a simulated or statistically-simulated instance of the electronic device can be employed.

Any of the methods or techniques described herein can be performed using software that comprises computer executable instructions for causing a computer to perform the methods or techniques stored on one or more computer readable memory device. Such software can comprise, for example, an electronic design automation (EDA) tool, such as a signal integrity tool. The Hyperlynx tool available from Mentor Graphics Corporation of Wilsonville, Oreg. is one example of a suitable software tool. With various implementations of the invention, the software may be executed on a single computer. With other implementations, the software may be executed upon a networked computer system. For example, via the Internet, a wide-area network, a local-area network, a client-server network, or other such network. For clarity, only certain selected aspects of the software based implementations are described. Other details that are well known in the art are omitted. For example, it should be understood that the disclosed technology is not limited to any specific computer language, program, or computer and that the disclosed technology can be implemented using any commercially available computer. An illustrative computing environment is described, but it is to be understood that this environment is not limiting and although all possible computing environments are not described, those of skill in the art are still capable of practicing the invention based upon the following disclosure.

Various implementations of the invention may use circuit design information. For example, printed circuit board layout information, such as a .HYP file, device models such as IBIS models, netlists, GDSII descriptions, or HDL descriptions such as Verilog or VHDL description, or other similar layout or device design description stored on one or more computer readable memory device. In certain implementations, the circuits to be simulated are instantiated as SPICE or Eldo models for simulation. For presentation purposes, the present disclosure sometimes refers to circuit components by their physical counterparts, such as drivers, channels, signals, and other such terms. It should be understood, however, that any such reference not only includes the physical components but also representations of such circuit components and signals on the components as may be used in a computer implemented signal integrity analysis environment.

Electrical System Including a Channel

Figure 4:
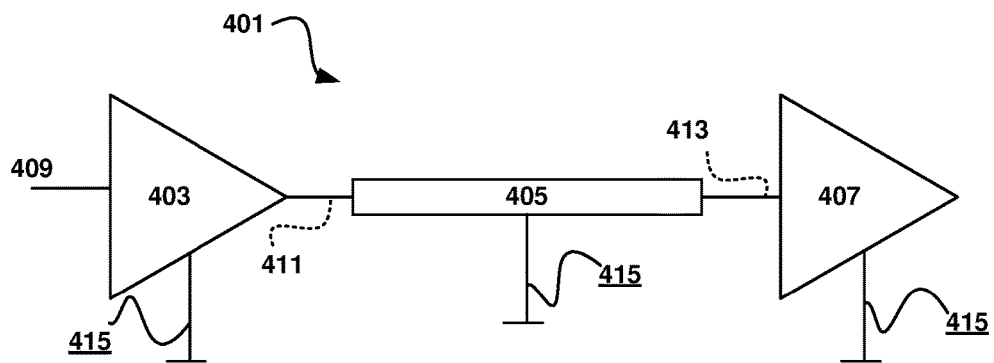
FIG. 4 illustrates an example electrical system.

FIG. 4 illustrates an exemplary electrical system 401. As can be seen in FIG. 4, the electrical system 401 includes a driver 403, a channel 405, and a buffer or receiver 407. With various implementations of the invention, the driver 403 can be a non-linear driver. In general, an electrical component can exhibit non-linear behavior when the sum of its responses does not equal the sum of its inputs. More particularly, in a linear system the response to the bit sequence '010' summed with the response to the bit sequence '001' would equal the response to the bit sequence '011'. The principle of linearity is often explained mathematically as follows. Given a function F wherein $Y_1=F(X_1)$ and $Y_2=F(X_2)$, if $X_s=X_1+X_2$ then $Y_s=F(X_1)=Y_1+Y_2$. In a non-linear system, the response to the bit sequence '011' may not equal the summed responses to the bit sequences '010' and '001'. Employing the same function F, and $Y_1$, $Y_2$, and $X_s$ defined above, in a non-linear system $Y_s=F(X_s) \neq Y_1 + Y_2$.

As can be seen in FIG. 4, the driver 403 includes an input 409 for receiving a digital signal, or d(t). Additionally, the driver 403 and the buffer 407 are connected by the channel 405. When a digital signal d(t) is placed on the driver 403 via the input 409, a response or voltage waveform, or V(t) is seen at the channel 405. The voltage waveform V(t) is often referred to as the driver voltage, or the transmitter voltage. The response of the driver 403 is measurable at a point 411 in the electrical system 401. Additionally, the response of the channel, or W(t), often referred to as the waveform at the receiver, or the receiver voltage, and is measurable at a point 413 in the electrical system 401. Furthermore, as can be seen in FIG. 4, the driver 403, the channel 405, and the buffer 407 are typically connected to a plurality of ground terminals 415.

As indicated above, the illustrative systems represented in FIG. 4, as well as other electrical systems may be actual physical devices. Accordingly, the signals, voltages and currents present in the system may be measured for example, by an oscilloscope. However, more often, various implementations of the invention will be practiced in conjunction with a simulated instance of the electrical system. Accordingly, the signals, voltages, currents and other values present in the system may be simulated as well.

Additionally, those of skill in the art will appreciate that various tools exists for describing an electrical system mathematically. More particularly, various mathematical tools exist for describing the properties of an electrical system in the time domain and the frequency domain. The equations described herein may be further modified and converted using the available tools, for example, the Laplace or Fourier transforms. Such conversions and modification of the described methods and exemplary implementations of the invention are within the scope of this disclosure.

Statistical Simulation on a Channel Receiving a Correlated Bit Pattern

Figure 5:
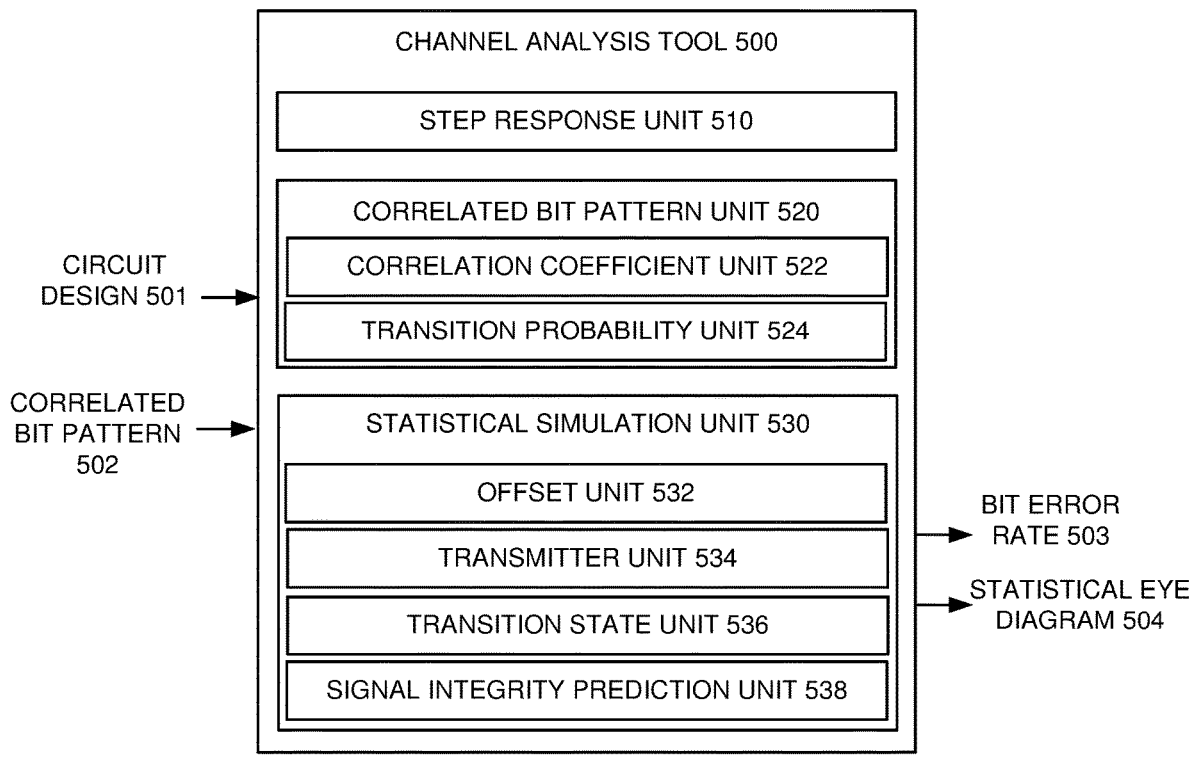
FIG. 5 illustrates an example channel analysis tool to perform statistical simulation on a channel receiving a correlated input pattern according to various embodiments of the invention.
Figure 6:
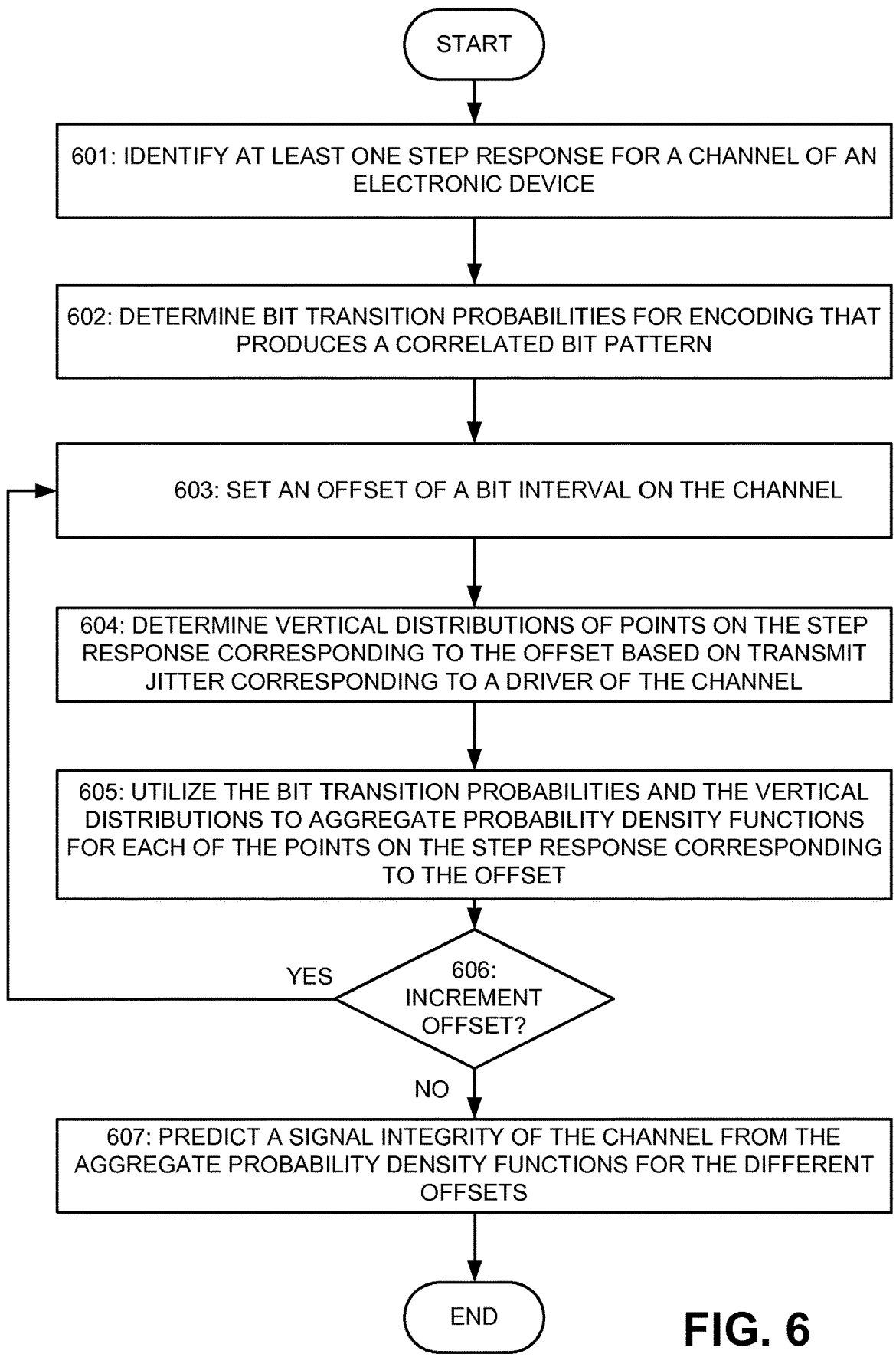
FIG. 6 illustrates a flowchart showing an example process for implementing statistical simulation on the channel receiving the correlated input pattern in FIG. 5.

FIG. 5 illustrates an example channel analysis tool 500 to perform statistical simulation on a channel receiving a correlated input pattern according to various embodiments of the invention. FIG. 6 illustrates a flowchart showing an example process for implementing statistical simulation on the channel receiving the correlated input pattern in FIG. 5. Referring to FIGS. 5 and 6, in a block 601, a computing system implementing the channel analysis tool 500 can identify at least one step response or transition edge for the channel of an electronic device. The step response or transition edge can correspond to a reaction of the channel to a voltage signal transition, for example, from low-to-high or high-to-low edge through the channel, the step response or transition edge can electrically characterize the channel.

The channel analysis tool 500 can include a step response unit 510 to identify the step response of the channel, in some embodiments, by performing a circuit simulation of the channel described in a circuit design 501, e.g., using analytical models of the channel, SPICE models, IBIS models, transistor-level models, ideal voltage source models, or other such models. In other implementations, the step response can measured from a test chip or other physical chip implementing the channel under consideration. In some embodiments, for example, when the channel is driven by a non-linear transmitter or driver, the channel may have multiple transition edges or step responses, the shape of which can be based on bits having been transmitted over the channel prior to the bit transition. The number of these previously transmitted bits that can affect the shape of the transition edges or step responses can be called a pre-history or history depth.

Figure 7:
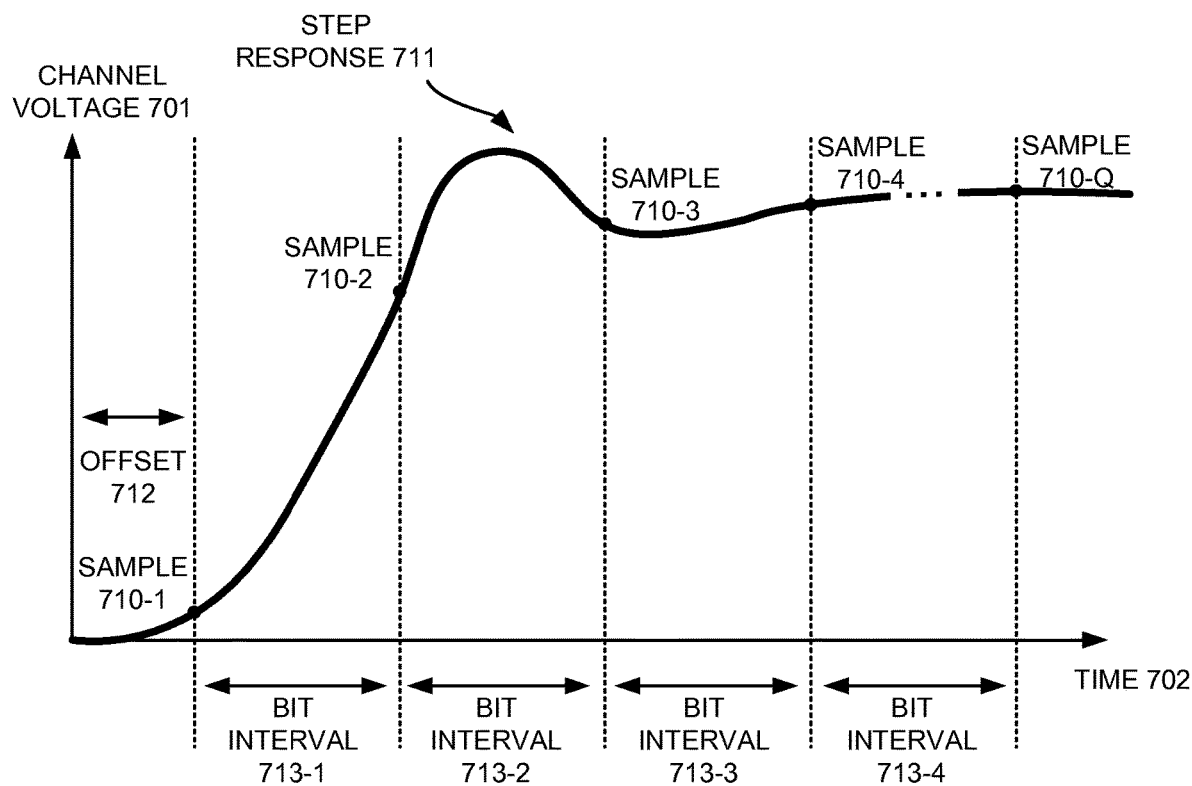
FIG. 7 illustrates an example step response of a channel being evaluated with statistical simulation according to various examples of the invention.

FIG. 7 illustrates an example step response of a channel being evaluated with statistical simulation according to various examples of the invention. Referring to FIG. 7, an x-y coordinate graph has a channel voltage 701 corresponding to the y-axis and time 702 corresponding to the x-axis. The graph shows a step response 711 of the channel over time 702, which, in this instance, corresponds to a channel voltage transition from a low-value to a high-value.

As will be described below in greater detail, the statistical simulation process can identify sample points 710-1 to 710-Q in the step response 711 of the channel. In some embodiments, these sample points 710-1 to 710-Q can be periodic corresponding to a bit interval 713-1 to 713-4 of transmissions on the channel. The initial sample 710-1 can be taken after an initial offset 712, for example, that can have a value set between zero to a duration of a bit interval. In some embodiments, a high-to-low step response can be the inverse or negative of the low-to-high step response 711 shown in FIG. 7.

Referring back to FIGS. 5 and 6, the channel analysis tool 500 can receive a correlated bit pattern 502, which can describe a protocol or encoding scheme, such as 64b/66b, 128b/130b, and other types of encoding, that can be utilized to encode an input bit pattern driven onto the channel. Since bit scramblers or synch-transition based pattern generators, for example, that implement the 64b/66b, 128b/130b, and other types of encoding, support DC balance on the channel during transmission and limit transition density and run length, i.e., a number of consecutive digital '0' or low values or digital '1' high values in an input to the channel, the bit values of the correlated bit pattern 502 are not statistically independent from each other. In other words, the correlated bit pattern 502 will include bit sequencing in which it is more probable that after a 'high' bit value the following bit will be a low' bit value, and vice versa. The channel analysis tool 500 can include a correlated bit pattern unit 520 to analyze the correlated bit pattern 502 to determine bit transition probabilities for the encoding or protocol that produces the correlated bit pattern 502, which is also shown in a block 602 of FIG. 6.

In some embodiments, the bit values of the correlated bit pattern 502 can be described by a set of correlation coefficients. The correlated bit pattern unit 520 can include a correlation coefficient unit 522 to determine the set of correlation coefficients from the correlated bit pattern 502. In some embodiments, the correlation coefficient unit 522 can analyze the correlated bit pattern 502 to determine its spectral density. Since the spectral density of a correlated bit pattern can be related to a correlation function including at least some of the correlation coefficients in the set, for example, by a Fourier transform, the correlation coefficient unit 522 can determine at least some of the correlation coefficients in the set from the spectral density of the correlated bit pattern 502. In some embodiments, second and higher-order correlation coefficients in the set can be found from analyzing a pattern generator implementing the encoding to the protocol. For example, by running test bits with the pattern generator implementing the encoding to the protocol, the correlation coefficient unit 522 cab estimate of the second and higher-order correlation coefficients in the set.

The correlated bit pattern unit 520 can include a transition probability unit 524 to determine the transition probabilities from the set of correlation coefficients. In some embodiments, the transition probability unit 524 can form a system of equations with the coefficients and solve the system of equations to identify the transition probabilities.

For example, the transition probability unit 524 can assume the probability of a next bit value in the correlated bit pattern 502 depend on N preceding bit values, and set $2^N$ weight coefficients or transition probabilities, denoted as $z_k$, k=0 ... $2^N$−1, in a N+1 layer binary tree or other state-based structure implemented by a computing system or in a programmable hardware device. For example, for N=3, we have: $z_0$=P(0|000), $z_1$=P(1|000), $z_2$=P(0|001), $z_3$=P(1|0-01), ... $z_{14}$=P(0|111), and $z_{15}$=P(1|111). In some embodiments, half of the correlation coefficients are independent, since P(0|$x_1 x_2$ ... $x_N$)+P(1|$x_1 x_2$ ... $x_N$)=1, hence $z_0$+$z_1$=1, $z_2$+$z_3$=1, ..., $z_{2^N-2}$+$z_{2^N-1}$=1.

The transition probability unit 524 can define two rectangular matrices with the transition probabilities:

$$M_{x1} = \begin{bmatrix} z_0 & 0 & \cdots & 0 \\ z_1 & 0 & \cdots & 0 \\ 0 & z_2 & \cdots & 0 \\ 0 & z_3 & \cdots & 0 \\ \cdots & \cdots & \cdots & \cdots \\ 0 & 0 & \cdots & z_{2^N-2} \\ 0 & 0 & \cdots & z_{2^N-1} \end{bmatrix} \quad (1)$$

$$M_{x2} = \begin{bmatrix} z_{2^N-1} & 0 & \cdots & 0 \\ z_{2^N-2} & 0 & \cdots & 0 \\ 0 & z_{2^N-3} & \cdots & 0 \\ 0 & z_{2^N-4} & \cdots & 0 \\ \cdots & \cdots & \cdots & \cdots \\ 0 & 0 & \cdots & z_1 \\ 0 & 0 & \cdots & z_0 \end{bmatrix} \quad (2)$$

Here, the two rectangular matrices $M_{x2}$ and $M_{x1}$ can differ from each other by having rows and columns re-arranged in reverse order.

The transition probability unit 524 can define a vector $P_{N+1}$ including the transition probabilities of a first $2^N$ code words, each one of (N+1) bit length, which can assume that these code words are 'naturally' ordered and represent the numbers from 0 to $2^N$−1. For example, $P_4$(0)=P(0000), $P_4$(1)=P(0001), ... $P_4$(7)=P(0111). The transition probability unit 524 can find the transition probabilities of the remaining code words from symmetry with respect to bit inversion: $P_{N+1}(2^{N+1}-1-a)=P_{N+1}(a)$, where a=0 ... $2^N$−1. For example, $P_4$(8)=$P_4$(7), $P_4$(9)=$P_4$(6), ..., $P_4$(15)=$P_4$(0), because P(1000)=P(0111), P(1001)=P(0110), ..., P(1111)=P(0000).

If the transition probability of a next symbol is defined by previous N symbols, the process can be represented by N-step binary Markov chain. Combining the equations expressing conditional probabilities, and the normalizing equation, the transition probabilities of all possible N+1 symbol code words can be found from the system of equations:

$$(I - M)P_{N+1} = 0 \quad (3)$$

$$2 \sum_{i=0}^{2^N-1} P_{N+1}(i) = 1 \quad (4)$$

Here, M=[$M_{x1}$, $M_{x2}$] can be a square matrix, I can be an identity matrix, both of size $2^N \times 2^N$. One of the equations in (3) can be eliminated because this subsystem is not linear independent. By solving the 'full' or 'reduced' system of equations (3) and (4) for $2^N$ unknowns, the transition probability unit 524 can find all the components of the vector $P_{N+1}$.

Once we have the transition probabilities of the code words, the correlation coefficients can be found from equation:

$$K(k_1, k_2, \ldots, k_L) = \sum_{i=0}^{2^{N+1}-1} \xi_{i,k_1} \xi_{i,k_2} \cdots \xi_{i,k_L} P_{N+1}(i) \quad (5)$$

Where $\xi_{i,k_l}$=1 if the $k_l$-th symbol in the code word $P_{N+i}$(i) equals 1, otherwise $\xi_{i,k_l}$=−1. There are some correlation coefficients which we can define from the transition probabilities of the code words of length N+1.

First, note that all correlations of the 3-rd (and any other odd order) are zero. Indeed, according to (5), the transition probability unit 524 can find the mean value of the product $\xi_{i,k_1}, \xi_{i,k_2}, \ldots \xi_{i,k_L}$ of odd number of multipliers. This product is either +1 or −1. We know that any code word in equation (5) has a bitwise-inversed twin which has the same probability. Since the factors $\xi_{i,k_l}$ in the twin words have opposite signs, and the number of them is odd, the signs of the products are opposite too, hence, the contributions from twins annihilate.

Then, consider even order correlations. We can define $C_N^1$ different correlations of the 2-nd order. Here, $C_N^1$ denotes the number of combinations from N of 1. To find all of them, the transition probability unit 524 can set $k_1$=1 and allow the second index to go through N other positions in the words. If the length of the code word is 4 or larger, the transition probability unit 524 can find $C_N^3$ correlations of the 4-th order. Here, the transition probability unit 524 can set $k_1$=1 and allow 3 other indexes to be chosen from the remaining N positions. In total, the transition probability unit 524 can derive $C_N^1 + C_N^3 \ldots + C_N^p = 2^{N-1}$ different independent correlations, where p is the largest odd number not exceeding N.

For an N+1 symbol words, we can set up $2^{N-1}$ independent correlation coefficients by choosing $2^{N-1}$ probabilities in the binary tree. Relationships between the order of the Markov chain, length of the code words, independent probability factors and correlation coefficients are shown below in Table 1:

| Number of preceding bits affecting the probability N | Length of the code words N + 1 | Number of independent probability factors in the binary tree $2^{N-1}$ | Number of independent correlation coefficients $2^{N-1}$ | What are the correlation coefficients |
|---|---|---|---|---|
| 1 | 2 | 1 | 1 | K(1, 2) |
| 2 | 3 | 2 | 2 | K(1, 2), K(1, 3) |
| 3 | 4 | 4 | 4 | K(1, 2), K(1, 3), K(1, 4), K(1, 2, 3, 4) |
| 4 | 5 | 8 | 8 | K(1, 2), K(1, 3), K(1, 4), K(1, 5), K(1, 2, 3, 4), K(1, 2, 3, 5), K(1, 2, 4, 5), K(1, 3, 4, 5) |
| 5 | 6 | 16 | 16 | K(1, 2), K(1, 3), K(1, 4), K(1, 5), K(1, 6), K(1, 2, 3, 4), K(1, 2, 3, 5), K(1, 2, 4, 5), K(1, 3, 4, 5), K(1, 2, 3, 6), K(1, 2, 4, 6), K(1, 3, 4, 6), K(1, 2, 5, 6), K(1, 3, 5, 6), K(1, 4, 5, 6), K(1, 2, 3, 4, 5, 6) |

So far, the relationships between the transition probabilities $y_k$, k=0 ... $2^N-1$, the probabilities of the code words of length N+1 packed into the vector $P_{N+1}$, and the correlation coefficients $K(k_1, k_2, ..., k_L)$ of different order. The transition probability unit 524 can solve the inverse problem given the set of $2^{N-1}$ correlation coefficients, find $2^N$ probabilities of the code words and $2^{N-1}$ transition probabilities, from the system if equations (3), (4), and (5). Note that (3) and (4) include $2^N$ independent equations, and (5) includes $2^{N-1}$ equations expressing $2^{N-1}$ different correlation coefficients. Therefore, the transition probability unit 524 can solve the entire system of equations by understanding the set of correlation coefficients, and find the transition probabilities for the correlated bit pattern 502.

The channel analysis tool 500 can include statistical simulation unit 530 to predict a signal integrity of the channel receiving the correlated bit pattern 502 based on the at least one step response identified by the step response unit 510 and the transition probabilities determined by the correlated bit pattern unit 520. The statistical simulation unit 530 can predict the signal integrity by building an eye diagram through statistical simulation. In some embodiments, the statistical simulation unit 530 can build the eye diagram by separately determining probability density functions for multiple different vertical cross-sections of the eye diagram. These probability density functions can represent a channel voltage transition from low-to-high and from high-to-low.

Figure 8:
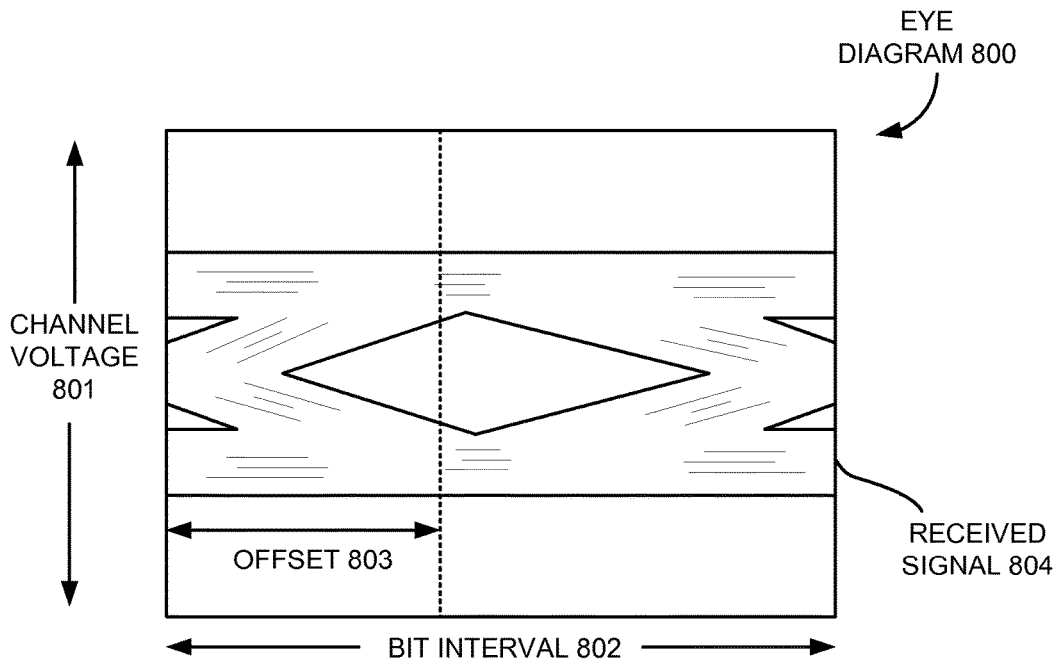
FIG. 8 illustrates an example eye diagram, showing signal integrity of a circuit pathway, built by statistical simulation of the channel according to various examples of the invention.

FIG. 8 illustrates an example eye diagram, showing signal integrity of a circuit pathway, built by statistical simulation of the channel according to various examples of the invention. Referring to FIG. 8, an eye diagram 800 has a channel voltage 801 corresponding to the y-axis and a bit interval 802 corresponding to the x-axis. The bit interval 802 can correspond to a period of time that a bit can be transmitted over the channel. The graph shows signals 804 received over the channel overlapped based on their corresponding bit interval 802. The signals 804 in the eye diagram 800 can identify both their voltage at various times during the bit interval 802, but, in some embodiments, also be presented as a density or frequency of their occurrence at a specific time-voltage intersection, for example, by their color in the eye diagram 800.

An offset 803 is also shown in FIG. 8 to illustrate how the offset 803 corresponds to a vertical cross-section in the eye diagram 800. In this instance, an offset 803 can identify a particular vertical cross-section in the bit interval 802 to evaluate. As will be discussed below in greater detail, the statistical simulation unit 530 can determine probability density functions for the vertical cross-section in the bit interval 802 associated with the offset 803, which will identify signal voltages at the vertical cross-section of the bit interval 802 and a density or frequency of their occurrence in the different points in the vertical cross-section of the bit interval 802.

Referring back to FIGS. 5 and 6, the statistical simulation unit 530 can include an offset unit 532 to set an offset for a bit interval on the channel. The offset for the bit interval can correspond to a vertical cross-section of the eye diagram for the channel. For example, in a block 603, the computing system implementing the channel analysis tool 500 can set the offset of the bit interval on the channel. The statistical simulation unit 530 can utilize the offset to determine various sample points in the at least one step response identified by the step response unit 510. In some embodiments, the sample points can be located in increments of one bit interval, such that each sample point corresponds to a same vertical cross-section of the bit interval for the channel.

The statistical simulation unit 530 can include a transmitter unit 534 to determine vertical voltage distributions capable of being seen on the channel during the step response. For example, in a block 604, the computing system implementing the channel analysis tool 500 can determine vertical distributions of points on the step response corresponding to the offset based on transmit jitter corresponding to a driver of the channel.

Since drivers or transmitters for the channel can be non-linear, transmit jitter can be introduced during transmission of the correlated bit pattern 502 on the channel. This transmit jitter can be transmitting bits early or late, which can affect signal integrity. In some embodiments, the transmit jitter can be random or deterministic, bounded or unbounded. The transmitter unit 534 can analyze the circuit design 501 or receive a characterization of the non-linear transmitter (not shown), and determine transmit jitter distributions corresponding to the different sample points identified by the statistical simulation unit 530 based on the offset.

The transmitter unit 534 can utilize the transmit jitter distributions and the at least one step response to determine vertical channel voltage distributions corresponding to each sample point identified by the statistical simulation unit 530 based on the offset. The vertical channel voltage distributions can each be a probability density function, which describes potential voltages of the step response at a corresponding sample point given the time-based transmit jitter. These probability density functions also can ascribe a probability or weight associated with the potential voltages of the step response at a corresponding sample point.

Figure 9:
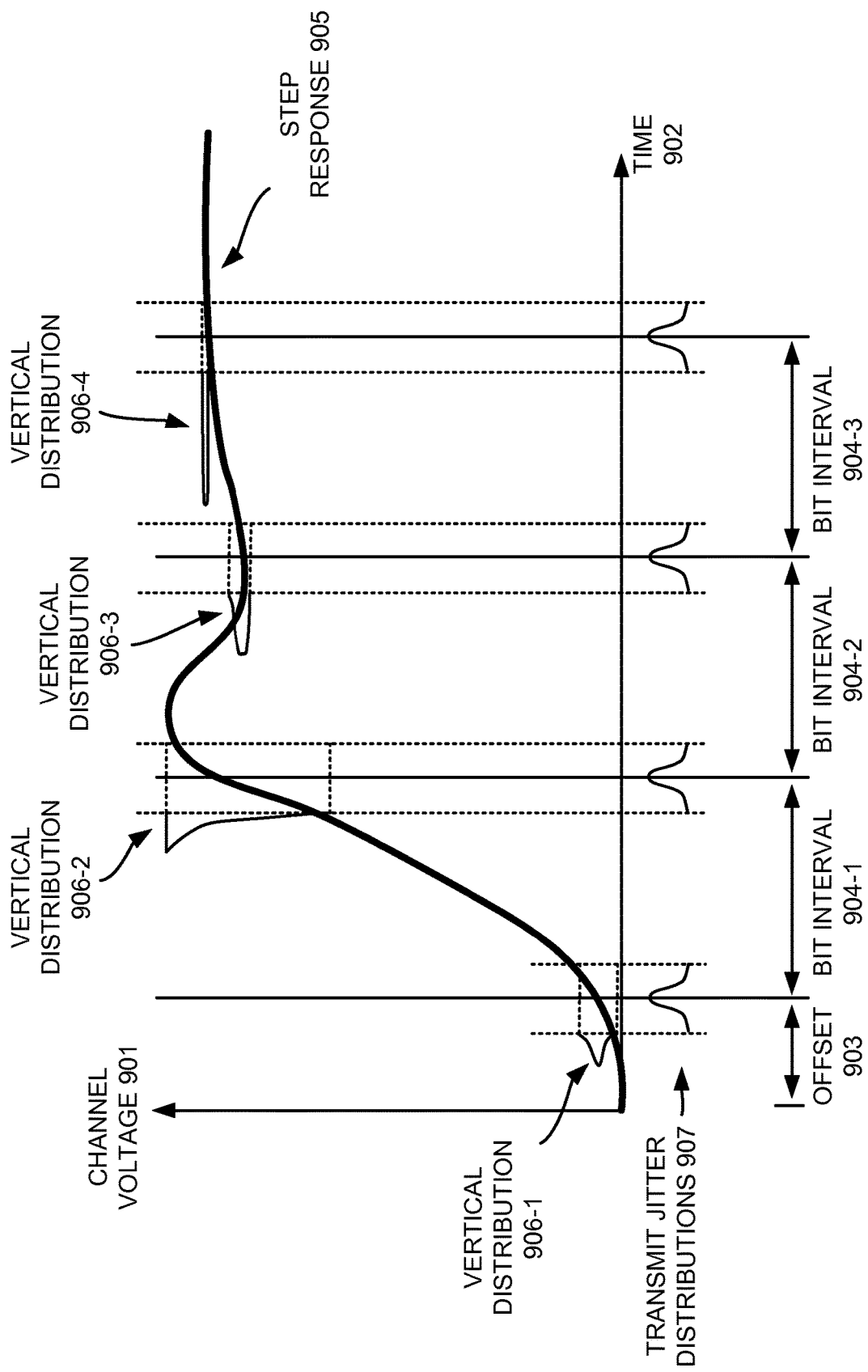
FIG. 9 illustrates an example step response of a channel with associated transmit jitter and vertical voltage distributions utilized with statistical simulation of the channel according to various examples of the invention.

FIG. 9 illustrates an example step response of a channel with associated transmit jitter and vertical voltage distributions utilized with statistical simulation of the channel according to various examples of the invention. Referring to FIG. 9, an x-y coordinate graph has a channel voltage 901 corresponding to the y-axis and time 902 corresponding to the x-axis. The graph shows a step response 905 of the channel over time 902, which, in this instance, corresponds to a channel voltage transition from a low-value to a high-value. In some embodiments, a high-to-low step response can be the inverse or negative of the low-to-high step response 905 shown in FIG. 9.

The statistical simulation unit 530 can identify sample points in the step response 905 of the channel. In some embodiments, these sample points can be periodic corresponding to a bit interval 904-1 to 904-3 of transmissions on the channel, which starts after an initial offset 903. The statistical simulation unit 530 can utilize the transmit jitter distributions 907 at each sample point of the step response 905 to determine possible voltages at each sample point in the presence of transmit jitter, which can be called vertical distributions 906-1 to 906-4. These vertical distributions 906-1 to 906-4 can be as probability density functions that identify potential voltages at each sample point as well as a probability or weight associated with each of the potential voltages of the step response at a corresponding sample point.

Referring back to FIGS. 5 and 6, since non-linear transmitters for channels can also introduce prehistory or history depth, which can create multiple different step responses for the channel based on previously transmitted bits over the channel, the transmitter unit 534 can determine the vertical voltage distributions for the multiple different step responses for the channel.

The statistical simulation unit 530 can include a transition state unit 536 to build a bit state transition structure that describe bit transitions in the correlated bit pattern 502 based on their transition probabilities and, optionally, on the vertical voltage distributions associated with the bit transitions. In some examples, the bit state transition structure can be implemented by the computing system or in a programmable hardware device.

Figure 10:
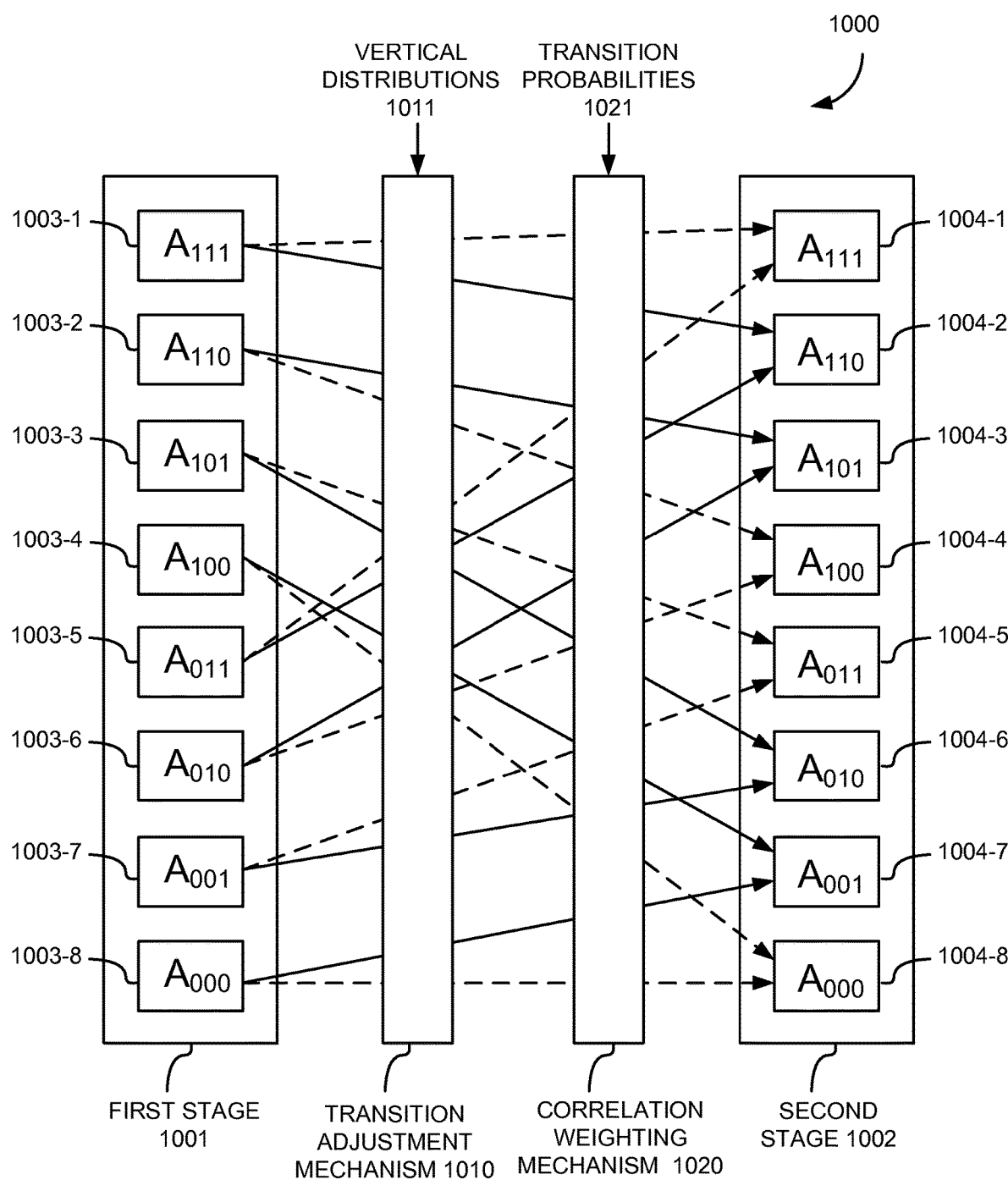
FIG. 10 illustrates an example bit state transition structure utilized with statistical simulation of the channel according to various examples of the invention.

FIG. 10 illustrates an example bit state transition structure 1000 utilized with statistical simulation of the channel according to various examples of the invention. Referring to FIG. 10, the bit state transition structure 1000 describes a bit transition in a correlated bit pattern. In this example implementation of the bit state transition structure 1000, there is a prehistory of 3 bits. Other implementations different numbers of prehistory bits can be utilized, for example, based on the transmitter of the channel.

The bit state transition structure 1000 includes a first stage 1001 having multiple state containers 1003-1 to 1003-8, each corresponding to a different state of the prehistory bits—with the rightmost bit in the state container corresponding to the most recent bit transmitted over the channel. The bit state transition structure 1000 includes a second stage 1002 having multiple state containers 1004-1 to 1004-8, each corresponding to a different state of the prehistory bits—with the rightmost bit in the state container corresponding to the most recent bit transmitted over the channel.

The bit state transition structure 1000 models bit transitions in the correlated bit pattern. For example, when a '0' bit is transmitted after three '1' bits have been transmitted, the bit state transition structure 1000 shows a transition from state container 1003-1 to 1004-2. Conversely, when a '1' bit is transmitted after three '1' bits have been transmitted, the bit state transition structure 1000 shows a transition from state container 1003-1 to 1004-1. The bit state transition structure 1000 models all of the possible bit transitions taking into account the prehistory associated with the channel. Bit transitions in which the bit does not change value, i.e., a '0' bit following a '0' bit or a '1' bit following a '1' bit are represented with a dashed line in FIG. 10. Bit transitions in which the bit change value, i.e., a '0' bit following a '1' bit or a '1' bit following a '0' bit are represented with a solid line in FIG. 10.

Each of the state containers 1003-1 to 1003-8 in the first stage 1002 can be loaded with a probability density function, which is passed to the corresponding state containers 1004-1 to 1004-8 in the second stage 1002, as shown by the transition lines between the state containers. The bit state transition structure 1000 includes two mechanisms to modify the probability density functions passed between the state containers. The first is a transition adjustment mechanism 1010, which can modify the probability density function based on the vertical distributions corresponding to a particular sample point. In some embodiments, the transition adjustment mechanism 1010 can selectively convolve the vertical distributions with the probability density functions transitioning between the first stage 101 and the second stage 1002. For example, the transition adjustment mechanism 1010 can convolve the probability density functions that correspond to a bit change value, i.e., a '0' bit following a '1' bit or a '1' bit following a '0' bit, with corresponding vertical distributions. Since the vertical distributions were determined for low-to-high bit transitions, when the bit change value is high-to-low, the transition adjustment mechanism 1010 can convolve a negative or inverse of the vertical distributions with the probability density functions.

In some embodiments, some of the states represented by the state containers 1003 in the first stage 1001 can have different step responses and therefore have different vertical distributions derived by the transmitter unit 534. The transition adjustment mechanism 1010 can apply the vertical distributions from the step response associated with prehistory of the corresponding state container. For example, if prehistory '010' corresponds to a certain step response and associated vertical distribution, the transition adjustment mechanism 1010 can convolve the probability density function from the state container 1003-6 with that vertical distribution as it transitions to state container 1004-3.

The second mechanism is a correlation weighting mechanism 1020, which can apply a weighting to the probability density functions transitioning between state containers between the stages 1001 and 1002. Since the encoding on the bit pattern input to the channel is correlated, the probability of the next bit (or stage) being '0' may not be equal to the probability of the next bit (or stage) being '1'. For example, the probability that state container 1003-8 transitions to state container 1004-8 corresponding to a '0' bit may be lower than the probability that it transitions to state container 1004-7 corresponding to a '1' bit. As such, the correlation weighting mechanism 1020 weighs the probability density functions based on the transition probabilities 1021 determined by the transition probability unit 522. In this example, each state container in the second stage 1002 receives multiple probability density functions, which can be added together in the receiving state container.

Referring back to FIGS. 5 and 6, the statistical simulation unit 530 can include a signal integrity unit 538 to build a statistical eye diagram 504 utilizing the bit state transition structure generated by the transition state unit 536. For example, in a block 605, the computing system implementing the channel analysis tool 500 can utilize the bit transition probabilities and the vertical distributions to aggregate probability density functions for each of the points on the step response corresponding to the offset.

The signal integrity unit 536 can initially load the first stage of the bit state transition structure with a Dirac delta functions—having a voltage level corresponding to a high level in state containers associated with a '1' bit, and having a voltage level corresponding to a low level in state containers associated with a '0' bit. The signal integrity unit 536 can transition the Dirac delta functions from the state containers in the first stage of the bit state transition structure to the second stage of the bit state transition structure, while performing modifications corresponding to the last sample point (for example, sample 710-Q in FIG. 7) along the at least one step response. The signal integrity unit 536 can move resulting probability density functions in the state containers in second stage into the corresponding state containers in the first stage and perform another transition between state containers, this time with the second to last sample point. The signal integrity unit 536 can continue this process until all of the sample points (for example, sample 710-1 in FIG. 7) have had their vertical distributions selectively convolved with probability density functions.

The signal integrity unit 536 can aggregate the state containers for the low-state and the high-state for all of the state containers, which corresponds to a specific vertical cross-section of the statistical eye diagram 504. In a block 606, the computing system implementing the channel analysis tool 500 can determine whether an additional offset of the bit interval on the channel can be evaluated, for example, by incrementing offset previously set in block 603. If so, execution returns to block 603, where the computing system implementing the channel analysis tool 500 can set a new offset of the bit interval on the channel. In some embodiments, the offset unit 532 in the statistical simulation unit 530 can select the new offset of the bit interval on the channel. Since each offset corresponds to a different vertical cross-section of the eye diagram shown in FIG. 8, in some embodiments, the statistical simulation unit 530 can increment the offset, for example, by a preset value, across the bit interval in order to realize aggregate probability density functions for the entire eye diagram—one cross-section at a time. In other embodiments, the statistical simulation unit 530 can analyze multiple offsets or cross-sections of the eye-diagram in parallel.

For example, if, in the block 606, the computing system implementing the channel analysis tool 500 determines to not evaluate an additional offset of the bit interval on the channel, execution continues to a block 607, where the computing system implementing the channel analysis tool 500 can predict a signal integrity of the channel from the aggregate probability density functions for the different offsets.

The signal integrity prediction unit 538 also can generate a bit error rate 503 based on the statistical eye diagram 504, for example, by determining a ratio of signals in the statistical eye diagram 504 fall within a preset location towards the center of the eye in the statistical eye diagram 504 to those signals that fall outside of the preset location. This ratio can describe a number of transmission errors are predicted to occur given a correlated input pattern transmitted by a non-linear transmitter possibly causing multiple transition and transmit jitter.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
identifying, by a computing system, that a test input for a channel in an electronic device conforms to protocol having a correlated bit pattern;
determining, by the computing system, transition probabilities for bits in the test input based on the protocol having the correlated bit pattern;
measuring, by the computing system, a step response of the channel;
generating, by the computing system, an eye diagram by utilizing the transition probabilities to identify weightings for different bit transitions in the protocol having the correlated bit pattern and combining the portions of the step response of the channel based, at least in part, on the identified weightings for the different bit transitions, wherein the combined portions of the step response of the channel generate at least a portion of the eye diagram; and
predicting, by the computing system, a signal integrity of the channel from the eye diagram.

2. The method of claim 1, wherein predicting the signal integrity of the channel further comprising generating a bit error rate for the channel from the eye diagram.

3. The method of claim 1, further comprising identifying, by the computing system, correlation coefficients that describe the correlated bit pattern in the test input, wherein determining the transition probabilities for bits in the test input is performed based on the correlation coefficients.

4. The method of claim 1, further comprising:
identifying, by the computing system, transmit jitter capable of being introduced by a transmitter of the test input onto the channel; and
determining, by the computing system, a vertical distribution of voltages in the step response of the channel based on the transmit jitter, wherein predicting the signal integrity of the channel is based on the vertical distribution of voltages in the step response of the channel and the transition probabilities for bits in the test input.

5. The method of claim 4, wherein the transmit jitter includes at least one of random jitter or deterministic jitter.

6. The method of claim 4, further comprising:
measuring, by the computing system, multiple step responses of the channel that differ based, at least in part, on values of one or more bits previously transmitted on the channel; and
determining, by the computing system, the vertical distributions of voltages in each of the multiple step responses of the channel based on the transmit jitter, wherein predicting the signal integrity of the channel is based on the vertical distribution of voltages in the step response of the channel and the transition probabilities for bits in the test input.

7. The method of claim 4, further comprising setting, by the computing system, an offset for a bit interval on the channel, wherein predicting the signal integrity of the channel further comprising utilizing the transition probabilities and the vertical distributions to aggregate probability density functions for multiple points in the step response of the channel corresponding to the offset.

8. A system comprising:
a memory system configured to store computer-executable instructions; and
a computing system, in response to execution of the computer-executable instructions, is configured to:
identify that a test input for a channel in an electronic device conforms to protocol having a correlated bit pattern;
determine transition probabilities for bits in the test input based on the protocol having the correlated bit pattern;
measure a step response of the channel;
generate an eye diagram by utilizing the transition probabilities to identify weightings for different bit transitions in the protocol having the correlated bit pattern and combining the portions of the step response of the channel based, at least in part, on the identified weightings for the different bit transitions, wherein the combined portions of the step response of the channel generate at least a portion of the eye diagram; and
predict a signal integrity of the channel from the eye diagram.

9. The system of claim 8, wherein the computing system, in response to execution of the computer-executable instructions, is further configured to predict the signal integrity of the channel by generating a bit error rate for the channel from the eye diagram.

10. The system of claim 8, wherein the computing system, in response to execution of the computer-executable instructions, is further configured to:
identify correlation coefficients that describe the correlated bit pattern in the test input; and
determine the transition probabilities for bits in the test input based on the correlation coefficients.

11. The system of claim 8, wherein the computing system, in response to execution of the computer-executable instructions, is further configured to:
identify transmit jitter capable of being introduced by a transmitter of the test input onto the channel;
determine a vertical distribution of voltages in the step response of the channel based on the transmit jitter; and
predict the signal integrity of the channel based on the vertical distribution of voltages in the step response of the channel and the transition probabilities for bits in the test input.

12. The system of claim 11, wherein the computing system, in response to execution of the computer-executable instructions, is further configured to:

measure multiple step responses of the channel that differ based, at least in part, on values of one or more bits previously transmitted on the channel;

determine the vertical distributions of voltages in each of the multiple step responses of the channel based on the transmit jitter; and predict the signal integrity of the channel based on the vertical distribution of voltages in the step response of the channel and the transition probabilities for bits in the test input.

13. The system of claim 11, wherein the computing system, in response to execution of the computer-executable instructions, is further configured to:

set an offset for a bit interval on the channel; and utilize the transition probabilities and the vertical distributions to aggregate probability density functions for multiple points in the step response of the channel corresponding to the offset.

14. An apparatus comprising at least one non-transitory computer-readable memory device storing instructions configured to cause one or more processing devices to perform operations comprising:

identifying that a test input for a channel in an electronic device conforms to protocol having a correlated bit pattern;

determining transition probabilities for bits in the test input based on the protocol having the correlated bit pattern;

measuring a step response of the channel;

generating an eye diagram by utilizing the transition probabilities to identify weightings for different bit transitions in the protocol having the correlated bit pattern and combining the portions of the step response of the channel based, at least in part, on the identified weightings for the different bit transitions, wherein the combined portions of the step response of the channel generate at least a portion of the eye diagram; and predicting a signal integrity of the channel from the eye diagram.

15. The apparatus of claim 14, wherein predicting the signal integrity of the channel further comprising generating a bit error rate for the channel from the eye diagram.

16. The apparatus of claim 14, wherein the instructions are configured to cause the one or more processing devices to perform operations further comprising identifying correlation coefficients that describe the correlated bit pattern in the test input, wherein determining the transition probabilities for bits in the test input is performed based on the correlation coefficients.

17. The apparatus of claim 14, wherein the instructions are configured to cause the one or more processing devices to perform operations further comprising:

identifying transmit jitter capable of being introduced by a transmitter of the test input onto the channel; and determining a vertical distribution of voltages in the step response of the channel based on the transmit jitter, wherein predicting the signal integrity of the channel is based on the vertical distribution of voltages in the step response of the channel and the transition probabilities for bits in the test input.

18. The apparatus of claim 17, wherein the transmit jitter includes at least one of random jitter or deterministic jitter.

19. The apparatus of claim 17, wherein the instructions are configured to cause the one or more processing devices to perform operations further comprising:

measuring multiple step responses of the channel that differ based, at least in part, on values of one or more bits previously transmitted on the channel; and determining the vertical distributions of voltages in each of the multiple step responses of the channel based on the transmit jitter, wherein predicting the signal integrity of the channel is based on the vertical distribution of voltages in the step response of the channel and the transition probabilities for bits in the test input.

20. The apparatus of claim 17, wherein the instructions are configured to cause the one or more processing devices to perform operations further comprising:

setting an offset for a bit interval on the channel; and utilizing the transition probabilities and the vertical distributions to aggregate probability density functions for multiple points in the step response of the channel corresponding to the offset.

* * * * *